(12) United States Patent
Jiang et al.

(10) Patent No.: US 9,638,834 B2
(45) Date of Patent: May 2, 2017

(54) HYBRID EPOXY-ACRYLIC WITH ZIRCONIUM OXIDE NANOCOMPOSITE FOR CURABLE COATINGS

(71) Applicants: ESSILOR INTERNATIONAL (COMPAGNIE GENERALE D'OPTIQUE), Charenton-le-pont (FR); SHANGHAI UNIVERSITY, Shanghai (CN)

(72) Inventors: Peiqi Jiang, Plano, TX (US); Liyi Shi, Shanghai (CN); Dengsong Zhang, Shanghai (CN); Tingting Yan, Shanghai (CN); Hongrui Li, Shanghai (CN); Jian Zhao, Singapore (SG)

(73) Assignees: ESSILOR INTERNATIONAL (COMPAGNIE GENERALE D'OPTIQUE), Charenton-le-Pont (FR); SHANGHAI UNIVERSITY, Shanghai (CN)

( * ) Notice: Subject to any disclaimer, the term of this patent is extended or adjusted under 35 U.S.C. 154(b) by 0 days.

(21) Appl. No.: 14/908,046

(22) PCT Filed: Jul. 25, 2013

(86) PCT No.: PCT/CN2013/080129
§ 371 (c)(1),
(2) Date: Jan. 27, 2016

(87) PCT Pub. No.: WO2015/010304
PCT Pub. Date: Jan. 29, 2015

(65) Prior Publication Data
US 2016/0161643 A1  Jun. 9, 2016

(51) Int. Cl.
*G02C 7/16* (2006.01)
*G02B 1/14* (2015.01)
*C09D 135/02* (2006.01)
*C09D 163/00* (2006.01)
*G02C 7/02* (2006.01)
*G02B 1/10* (2015.01)
*C08F 230/08* (2006.01)
*C08K 9/06* (2006.01)

(52) U.S. Cl.
CPC ............ *G02B 1/14* (2015.01); *C09D 135/02* (2013.01); *C09D 163/00* (2013.01); *G02B 1/10* (2013.01); *G02C 7/02* (2013.01); *C08F 230/08* (2013.01); *C08K 9/06* (2013.01); *G02C 2202/16* (2013.01)

(58) Field of Classification Search
CPC ... C09D 163/00; C09D 135/02; C08F 230/08; C08K 9/06; G02B 1/14; G02B 1/10; G02B 1/105; G02C 7/02; G02C 2202/16
USPC ........ 351/159.57; 427/402; 106/287.22, 438, 106/450, 635
See application file for complete search history.

(56) References Cited

U.S. PATENT DOCUMENTS

2007/0141114 A1* 6/2007 Muisener ............ C09D 5/1693
424/427
2011/0229768 A1 9/2011 Pan et al.

FOREIGN PATENT DOCUMENTS

| WO | 2010/041968 A2 | 4/2010 |
| WO | 2010/069189 A1 | 6/2010 |
| WO | 2010/138440 A1 | 12/2010 |
| WO | 2013/007015 A1 | 1/2013 |

OTHER PUBLICATIONS

International Search Report, dated May 21, 2014, from corresponding PCT Application.

* cited by examiner

*Primary Examiner* — Tuyen Tra
(74) *Attorney, Agent, or Firm* — Young & Thompson

(57) ABSTRACT

A composition includes: a continuous liquid phase including an acrylic monomer and an epoxy monomer; and a dispersed nanoparticulate including $ZrO_2$ modified with an acrylic silane; and wherein the composition is transparent to visible light when coated on a lens. In addition, a method including the steps of: mixing an acrylic silane and a methanol-based $ZrO_2$ sol to create a methanol-based silane-modified $ZrO_2$ sol; then mixing at least an acrylic monomer, an epoxy monomer, and the methanol-based silane-modified $ZrO_2$ sol to obtain the composition. The composition can be adapted for coating and curing onto another substrate, such as an ophthalmic lens.

20 Claims, No Drawings

HYBRID EPOXY-ACRYLIC WITH ZIRCONIUM OXIDE NANOCOMPOSITE FOR CURABLE COATINGS

CROSS-REFERENCE TO RELATED APPLICATIONS

Not Applicable.

PARTIES TO JOINT RESEARCH AGREEMENT

Essilor International (Compagnie Generale D'Optique) and Shanghai University.

TECHNICAL FIELD

The inventions are in the field of hard coat materials, and more particularly to compositions and methods of preparing such coatings.

BACKGROUND

The compositions, articles, and methods disclosed herein have applications in many fields, such as hard coats. This disclosure focuses on applications on the ophthalmic field. More specifically, this disclosure focuses on methods of producing UV curable high refractive index (RI), clear, low-haze, coatings.

Hybrid epoxy-acrylic coatings provide good mechanical and optical properties. Such hybrid formulations are used in optical coating applications, especially in UV-cured coatings for plastic ophthalmic lenses.

Due to its unique, high refractive index (RI) and other mechanical properties, such as hardness and durability, zirconium dioxide ($ZrO_2$) nanoparticulate has been investigated for use in protective coatings, and especially optical coatings.

Zirconium dioxide has successively been dispersed in acrylic monomers or in epoxy monomers. For example, $ZrO_2$ colloids can be dispersed in either acrylic or epoxy monomers where the $ZrO_2$ nanoparticle surface is first functionalized, such as with silane compounds. Dispersed $ZrO_2$ colloid in either acrylic or epoxy monomers can provide stable, clear fluids, capable of application to a surface, as a coating.

It has been believed that a colloidal dispersion of $ZrO_2$ in a mixture of acrylic and epoxy monomers together would provide better optical and mechanical coating properties for applications such as plastic lenses. However, an acrylic $ZrO_2$ colloid and an epoxy $ZrO_2$ colloid have not been successfully mixed together for coating applications. The mixture becomes opaque or gels (making it unsuitable for application as a coating). No satisfactory solutions exist for $ZrO_2$ colloids dispersed in a hybrid of epoxy-acrylic system.

Therefore, there is a need for a composition, and method of making a composition, comprising a high-index, $ZrO_2$ nanoparticle colloid coating solution in an epoxy-acrylic hybrid system for UV curable coating applications.

SUMMARY

In this innovation, methods for dispersing $ZrO_2$ nanoparticles in a hybrid epoxy-acrylic monomer solution are disclosed, wherein the zirconium dioxide is functionalized with an acrylic silane. The composition is a translucent liquid at room temperature.

The composition can be used to form a curable composition, which can be coated onto a surface and then UV cured. Further, the compositions presented result in a low-haze coating on a polycarbonate (PC) lens after UV curing.

A composition according to the invention includes: a continuous liquid phase comprising an acrylic monomer and an epoxy monomer; and a dispersed nanoparticulate comprising $ZrO_2$ modified with an acrylic silane; and wherein the composition is stable and transparent to visible light when coated on a lens.

A method according to the invention for forming or using the composition includes the steps of: mixing an acrylic silane and a methanol-based $ZrO_2$ sol to create a methanol-based silane-modified $ZrO_2$ sol; then mixing at least an acrylic monomer, an epoxy monomer, and the methanol-based silane-modified $ZrO_2$ sol to obtain the composition. Finally, the methanol solvent may be removed or left in, when necessary.

The composition and methods can be adapted for use in coating onto another substrate, such as an ophthalmic lens.

Accordingly, an optical article is provided, the article comprising: an ophthalmic lens substrate; and a transparent, cured coating on the ophthalmic lens substrate, wherein the coating comprises: a continuous solid phase comprising an acrylic-epoxy copolymer; and a dispersed nanoparticulate of $ZrO_2$ modified with an acrylic silane.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

DEFINITIONS

A gel is a semi-solid, jelly-like physical state or phase. The physical state of a gel is formed by a network of interconnected molecules, such as a crosslinked polymer or a network of micelles. At the molecular level, a gel is a dispersion in which both the network of molecules is continuous and the liquid is in a continuous phase. A plastic material is any of a wide range of synthetic or semi-synthetic organic solids that are moldable. Plastics are typically organic polymers of high molecular mass, but they often contain other chemicals.

As used herein, if not other otherwise specifically stated, the physical state of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions.

As used herein, a particulate is a grouping of particles having similar chemical composition and particle size ranges anywhere in the range of about 5 nanometer (nanoparticles) up to 3 millimeters. Nanoparticles are normally considered to be particles having dimensions of in the range of up to about 100 nm. The nanoparticles can have a variety of shapes, such as, but not limited to, spherical, rod, plate, cube, triangular, hexagonal, and many others. In comparison, microparticles are particles that can have dimensions in the range of between about 100 nm and about 50,000 nm in size.

Dispersions

A dispersion is a system in which particles of a substance of one chemical composition and physical state are dispersed in another substance of a different chemical composition or physical state.

A heterogeneous dispersion is a "suspension" where the dispersed particles are larger than about 50 micrometers. A heterogeneous dispersion is a "colloid" where the dispersed particles range up to about 50 micrometer (50,000 nanometers) in size.

Chemicals, Materials, and Measurements

As used herein, "modified" or "derivative" means a chemical compound formed by a chemical process from a parent compound, wherein the chemical backbone skeleton of the parent compound is retained in the derivative.

As used herein, "water-based" means that water is at least 10% by weight of the continuous phase of a fluid. As used herein, "methanol-based" means the methanol is at least 10% by weight of the continuous phase of a fluid.

As used herein, "silane" refers to an organic chemical compound containing silicon, such as trichlorosilane ($SiHCl_3$) and tetramethyl silane ($Si(CH_3)_4$). Some silanes, such as alkoxy silanes, are highly reactive.

As used herein, an "acrylic silane" is a silane that is also an acrylic compound that additionally contains an acryloyl group.

As used herein, 3-methacryloxypropyltrimethoxysilane is referred to as "MPS".

As used herein, 3-glycidoxypropyltrimethoxysilane is referred to as "GPS".

As used herein, a "polymer" or "polymeric material" includes polymers, copolymers, terpolymers, etc. In addition, the term "copolymer" as used herein is not limited to the combination of polymers having two monomeric units, but includes any combination of monomeric units, e.g., terpolymers, tetrapolymers, etc.

As used herein, "acrylic" can refer to chemical compounds that contain an acryloyl group, which can be derived from acrylic acid, or to a polymerized product (e.g., a resin or plastic) formed with such an acrylic compound, and (meth)acrylic compounds.

As used herein, "epoxy" can refer to chemical compounds that contain an epoxy group or a polymerized product (e.g., a resin or plastic) formed with such an epoxy compound.

"DAR1173™" refers to 2-hydroxy-2-methyl-1-phenyl-propane-1-one, which is a free-radical photo-polymerization initiator commercially available from Ciba Japan K.K, now part of BASF, also marketed under the tradename DAROCURE 1173™.

"UVI6976™" refers to a cationic photo-polymerization initiator containing a mixture of triarylsulfonium hexafluoroantimonate salts in propylene carbonate, which is commercially available from Dow Chemical.

"EFKA3034™" is a fluorocarbon-containing organically modified polysiloxane, about 50 wt % active in a solvent of methoxypropanol, which is commercially available from BASF. It can be used as an additive to improve the wetting of the substrate and leveling of a coating.

As used herein, "resin" encompasses synthetic substances of similar mechanical properties to natural resins, that is, highly viscous liquids that may harden into transparent solids. A polycarbonate (PC) resin or plastic refers to any of a group of thermoplastic polymers containing carbonate groups. PC plastic is commonly used in ophthalmic products such as eyeglass lenses.

Allyl diglycol carbonate (ADC) plastic, also known as "CR-39", is a plastic polymer of diethyleneglycol bis allylcarbonate in presence of diisopropyl peroxydicarbonate (IPP) initiator and heat. A peroxide can also be used as an initiator. The presence of the allyl groups allows the polymer to form cross-links. ADC is a thermosetting polymer. ADC plastic is commonly used in the manufacture of eyeglass lenses. A commercial example is ORMA™ lenses available from Essilor International. Other examples of optical lens substrates or "optical base element" is understood to mean ophthalmic lenses and lenses for optical instruments; "ophthalmic lenses" are defined as lenses adapted namely for mounting in eyeglasses whose function is to protect the eye and/or to correct vision; these lenses are selected from the afocal, unifocal, bifocal, trifocal, and progressive lenses.

The substrate of the optical base element may be of thermosetting or thermoplastic nature. The optical base element is made of a material classically used in optics and ophthalmology. By way of information but not limitation, the materials are chosen from among the polycarbonates; polyamides; polyimides; polysulfones; copolymers of polyethylene there phthalate and polycarbonate; polyolefins, namely polynorbornenes; polymers and copolymers of diethylene glycol bis(allylcarbonate); (meth)acrylic polymers and copolymers, namely (meth)acrylic polymers and copolymers derived from bisphenol-A; thio(meth)acrylic polymers and copolymers; urethane and thiourethane polymers and copolymers; epoxy polymers and copolymers; and episulfide polymers and copolymers.

As used herein, the term "multifunctional monomer" means a molecule that has more than one potential reactive site by which it can form intermolecular chemical bonds. For example, the functionality of a monomer molecule is the number of functional groups which participate in the polymerization. The multifunctional monomer can have, for example, 3 to 6 potential reactive sites or functionalities. Such multifunctional monomers may be used in polymerizations to form branched or crosslinked chains.

As used herein, a "plano" lens does not have an optical power for correcting vision.

The optical properties of films and packaging material, clear or translucent specimens, and raw materials for paint and plastics can be differentiated by using the following measurement values: haze, clarity, and total transmittance. An example of a laboratory instrument to objectively evaluate total appearance of transparent products is a HAZE-GARD PLUS™ optical testing instrument, which is commercially available from BYK-Gardner.

As used herein, "transparent" means having at least 80% transmittance to the full spectrum of visible light, which has a wavelength in the range of about 380 nm to about 740 nm.

As used herein, transmittance is the ratio of transmitted light to total light directed through a medium at a particular wavelength or over a spectrum.

As used herein, "haze" is the ratio of diffuse transmittance divided by total transmittance.
General Approach $ZrO_2$ nanoparticles can be dispersed in either solutions of acrylic or epoxy monomers (or in the respective resins of low-molecular weight polymers thereof) with the surface treatment agents (MPS or GPS for the respective monomers). In an alternative embodiment, $ZrO_2$ microparticles can be used. However, regardless of the order of mixing, there is a compatibility issue whenever a solution or resin of an acrylic monomer with a dispersed MPS-modified $ZrO_2$ nanoparticulate is mixed with a solution or resin of an epoxy monomer with a dispersed GPS-modified $ZrO_2$ nanoparticulate. The mixed solution forms a gel or becomes opaque.

Therefore, it is an object in this innovation to form a composition of $ZrO_2$ nanoparticles dispersed into a solution or resin including both acrylic and epoxy monomers. A stable sol composition was obtained when $ZrO_2$ nanoparticulate is first functionalized with MPS in methanol solvent and then mixed with a solution including both acrylic and epoxy monomers.

It is another object of this innovation to reduce the haze exhibited by acrylic $ZrO_2$ colloid and epoxy $ZrO_2$ colloid on PC lenses after spin-coating and UV-curing. When $ZrO_2$ nanoparticles first functionalized with MPS are dispersed in a solution or resin of epoxy and acrylic monomers, haze is greatly reduced when coated on a surface of a PC lens.

In this innovation, methods for dispersing $ZrO_2$ nanoparticles in a hybrid epoxy-acrylic monomer solution are disclosed, wherein the zirconium dioxide is functionalized with an acrylic silane. The composition is a translucent liquid at room temperature.

The composition can be used to form a curable composition, which can be coated onto a surface and then UV cured. Further, the compositions presented result in a low-haze coating on a polycarbonate (PC) lens after UV curing. A composition according to the invention includes: a continuous liquid phase comprising an acrylic monomer and an epoxy monomer; and a dispersed nanoparticulate comprising $ZrO_2$ modified with an acrylic silane; and wherein the composition is stable and transparent to visible light when coated on a lens.

The composition and methods can be adapted for use in coating onto another substrate, such as an ophthalmic lens.

Accordingly, an optical article is provided, the article comprising: an ophthalmic lens substrate; and a transparent, cured coating on the ophthalmic lens substrate, wherein the coating comprises: a continuous solid phase comprising an acrylic-epoxy copolymer; and a dispersed nanoparticulate of $ZrO_2$ modified with an acrylic silane.

In general, the methods for preparing a composition or optical article according to the invention includes the steps of: mixing an acrylic silane and a methanol-based $ZrO_2$ sol to create a methanol-based silane-modified $ZrO_2$ sol; then mixing at least an acrylic monomer, an epoxy monomer, and the methanol-based silane-modified $ZrO_2$ sol to obtain a composition comprising: a continuous liquid phase comprising an acrylic monomer and an epoxy monomer; and a dispersed nanoparticulate comprising $ZrO_2$ modified with an acrylic silane; and wherein the composition is stable and transparent to visible light when coated on a lens.

The methods can include a step of forming the methanol-based $ZrO_2$ sol. Preferably, the step of forming the methanol-based $ZrO_2$ sol comprises the step of dialyzing a water-based $ZrO_2$ sol in a methanol bath.

Preferably, the step of mixing the acrylic silane and the methanol-based $ZrO_2$ sol further comprises mixing under agitation at a temperature below 30° C. to form a sol or a suspension.

Preferably, the acrylic silane is 3-methacryloxypropyltrimethoxysilane ("MPS"). Other examples of an acrylic silane that can be used according to the invention are selected from the group consisting of: 3-(methacryloyloxy) propyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, 3-(Acryloxypropyl)trimethoxysilane, Vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, and any combination thereof. Preferably, the molar ratio of the acrylic silane to $ZrO_2$ is in the range of 0.1:1 to 0.2:1. Without being limited by any hypothesis, it is believed that the silane functionality reacts or interacts with the surface of the $ZrO_2$.

Preferably, the mole ratio of the acrylic monomer to the epoxy monomer is in the wt % range of approximately 10:90 to 90:10.

Preferably, the acrylic monomer is 1,6-hexandiol diacrylate (HDDA). Other examples of an acrylic monomer that can be used according to the invention are selected from the group consisting of: difunctional (meth)acrylate monomers, trifunctional acrylic monomers, multifunctional (meth) acrylic monomer(s), poly(meth)acrylate monomers, such as pentaerythritol triacrylate, trimethylolpropane triacrylate, trimethylolpropane trimethacrylate, pentaerythritol tetraacrylate, glycerol triacrylate, 1,2,4-butanetriol trimethacrylate, propoxylated trimethylolpropane triacrylate, propoxylated glyceryl triacrylate, tris(2-hydroxy ethyl)isocyanurate triacrylate, ethoxylated trimethylolpropane triacrylate, di-trimethylolpropane tetraacrylate, dipentaerythritol pentaacrylate, ethoxylated pentaerythritol tetraacrylate, caprolactone modified dipentaerythritol hexaacrylate, dipentaerythritol hexaacrylate, and their mixtures. More specifically, the polyol poly(meth)acrylate monomers may be chosen from: pentaerythritol tri- and/or tetraacrylate, dipentaerythritol hexaacrylate, polyol poly(meth)acrylate monomers, polyurethane poly(meth)acrylate monomers, and any combination thereof. It should be understood that the acrylic monomers can be partially pre-polymerized.

Preferably, the epoxy monomer is 1,4-butanediol diglycidyl ether (BDDGE). Other examples of an epoxy monomer that can be used according to the invention are selected from the group consisting of difunctional epoxy monomers, trifunctional epoxy monomers, multifunctional epoxy monomers, polyol polyglycidyl ether monomers, such as trimethylolmethane triglycidyl ether, trimethylolethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2, 6-hexanetriol triglycidyl ether, glycerol triglycidyl ether, diglycerol triglycidyl ether, diglycerol tetraglycidyl ether, dipentaerythritol tetraglycidyl ether, glycerol ethoxylate triglycidyl ether, glycerol propoxylate triglycidyl ether, sorbitol polyglycidyl ether, polyglycerol polyglycidyl ether, pentaerythritol polyglycidyl ether such as pentaerythritol tetraglycidyl ether, poly(glycidyl acrylate), poly(glycidyl methacrylate), epoxy-modified polyunsaturated fatty acids, castor oil triglycidyl ether, polyfunctional epoxy monomers, and any combination thereof. It should be understood that the epoxy monomer can be partially pre-polymerized.

The dispersed nanoparticulate can be in the range of 10 to 70 wt % of the wet composition. Preferably, the dispersed nanoparticulate is in the range of 30 to 60 wt % of the composition.

The methods preferably further include a step of removing partially or essentially all the methanol from the composition. For example, the step of removing partially or essentially all the methanol from the composition can include a step of rotary evaporation.

Preferably, the methods can include a step of forming the composition with at least one photo-polymerization initiator for polymerizing the acrylic and epoxy monomers. For example, the photo-polymerization initiator is selected from the group consisting of: 2-hydroxy-2-methyl-1-phenylpropane-1-one, a triarylsulfonium hexafluoroantimonate salt, haloalkylated aromatic ketones such as chloromethylbenzophenones; some benzoin ethers such as ethyl benzoin ether and isopropyl benzoin ether; dialkoxyacetophenones such as diethoxyacetophenone and α,α-dimethoxy-α-phenylacetophenone; hydroxy ketones such as (1-[4-(2-hydroxyethoxy)-phenyl]-2-hydroxy-2-methyl-1-propan-1-one-) (Irgacure® 2959 from CIBA), 1-hydroxy-cyclohexyl-phenyl-ketone (Irgacure® 184 from CIBA) and 2-hydroxy-2-methyl-1-phenylpropan-1-one (such as Darocur® 1173 sold by CIBA); alpha amino ketones, particularly those containing a benzoyl moiety, otherwise called alpha-amino acetophenones, for example 2-methyl 1-[4-phenyl]-2-morpholinopropan-1-one (Irgacure® 907 from CIBA), (2-benzyl-2-dimethyl amino-1-(4-morpholinophenyl)-butan-1-one (Irgacure® 369 from CIBA); monoacyl and bisacyl phosphine oxides and sulphides, such as phenylbis(2,4,6-trimethylbenzoyl)-phosphine oxide (Irgacure® 819 sold by CIBA); triacyl phosphine oxides, and any mixture thereof.

Mixtures of free-radical photo-initiators may also be used to reach both surface cure and through cure. A mixture which may be used in one embodiment of this invention comprises Darocur® 1173 with Irgacure® 819, in a weight ratio of Darocur® 1173 to Irgacure® 819, which may range from 75:25 to 85:15, for instance of about 80:20. In another embodiment, free-radical initiator blends, such as Genocure® LTM sold by RAHN USA CORP., may be used.

Useful cationic initiators for the purpose of this invention include the aromatic onium salts, including salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate (such as Cyracure® UVI-6992 sold by DOW CHEMICALS) and triphenylsulfonium hexafluoroantimonate (such as Cyracure® UVI-6976 sold by DOW CHEMICALS), and salts of Group VIIa elements, such as iodonium salts, e.g., diphenyliodonium chloride. Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115, the disclosure of which is incorporated herein by reference. Preferred cationic initiators for use in the compositions of this invention are the salts of Group VIa elements and especially the sulfonium salts.

Mixtures of cationic photo-initiators may also be used to reach both surface cure and through cure. A preferred mixture comprises Cyracure® UVI-6992 with Cyracure® UVI-6976, in a weight ratio of UVI®-6976 to UVI®-6992 which may range from 70:30 to 80:20, for instance about 75:25.

Preferably, the photo-polymerization initiator is in the range of 1 to 6 wt % of the monomers in the continuous liquid phase of the composition. Of course, this step of forming can be as simple as mixing, either together or separately from another mixing step. In one exemplary embodiment, the polymerizing can be induced by UV polymerization, followed by drying the composition or suspension into a resulting layer on the lens.

Preferably, the methods can include a step of forming the composition with a surfactant. For example, the surfactant is a fluorocarbon-containing organically modified polysiloxane. Preferably, the surfactant is in the range of 0.05 to 0.5 wt % of the monomers in the continuous liquid phase of the composition. Of course, this step of forming can be as simple as mixing, either together or separately from another mixing step.

A method according to the invention can additionally include a step of coating the composition onto an ophthalmic lens to obtain a coated lens. For example, the step of coating can further include a step of spinning the ophthalmic lens substrate according to methods known to those of skill in the art. After the step of coating, the methods can further include a step of UV curing the coating of the composition onto the ophthalmic lens. Of course, for this purpose the composition should be adapted to be a UV-curable composition, for example, by including a photo-polymerization initiator. The ophthalmic lens can comprise a plastic selected from the group consisting of: polycarbonate (PC), allyl diglycol carbonate (ADC), diethylene glycol diallyl carbonate, allyl diglycol carbonates, allylic esters, acrylic esters, acrylates, methyl, allyl and butyl methacrylates, polycarbonates, styrenics, polyesters, allyl diglycol carbonates, triallyl cyanurate, triallyl phosphate, triallyl citrate, diallyl phenyl phosphonate, urethanes, epoxies and silicones, acrylic high index materials, thiol-polyurethane materials, high index lens materials, such as 1.6 Thin & Light lens, 1.67 Thin & Light lens made by polyurethane materials, and 1.74 Thin and Light lenses made by epi-thio materials.

EXAMPLES

To facilitate a better understanding of the present invention, the following examples of some embodiments are given. In no way should the following examples be read to limit, or define, the entire scope of the invention.

Preparation of Methanol-Based MPS-Modified $ZrO_2$ Sol

Water-based $ZrO_2$ sol (200 ml) (as described in. WO 2013/007015A1, assigned to Essilor International (Compagnie Generale d'Optique), which is incorporated by reference in its entirety) was charged to a dialysis bag (Molecular Weight Cut Off 8000-14000) and dialyzed in a methanol bath (2 liters). The methanol was replaced after 2 hours and the same process was repeated three times in order to obtain a methanol-based $ZrO_2$ sol.

Then 3-methacryloxypropyl trimethoxysilane (MPS) was added gradually into the methanol-based $ZrO_2$ sol in a molar ratio of MPS to $ZrO_2$ in the range of 0.1:1 to 0.2:1 under agitation at a temperature lower than 30° C. The mixture was sonicated at room temperature for 30 to 120 minutes at a power 100-400 W and a frequency of 20-80 KHz. A methanol-based MPS-modified $ZrO_2$ sol was obtained.

Comparative Preparation of Methanol-Based GPS-Modified $ZrO_2$ Sol

Water-based $ZrO_2$ sol (200 ml) was charged to a dialysis bag (MWCO 8000-14000) and dialyzed in a methanol bath (2 liters). The methanol was replaced after 2 hours and the same process was repeated three times in order to obtain a methanol based $ZrO_2$ sol.

Then 3-glycidoxypropyltrimethoxysilane (GPS) was added gradually into the methanol-based $ZrO_2$ sol according to the molar ratio of GPS to $ZrO_2$ in the range of 0.1:1 to 0.2:1 under agitation at a temperature lower than 30° C. The mixture was sonicated at room temperature for 30 to 120 minutes at a power of 100-400 W and a frequency of 20-80 KHz. A methanol-based GPS-modified $ZrO_2$ sol was obtained.

Example 1

MPS-Modified $ZrO_2$ in Acrylic-Epoxy Monomers

In one embodiment, a mixture of between about 30 wt %:70 wt % to about 70 wt %:30 wt % of 1,6-hexandiol diacrylate (HDDA) and 1,4 butanediol diglycidyl ether (BDDGE) was slowly added into the methanol-based MPS-modified $ZrO_2$ sol with stirring. In yet another embodiment, a mixture (50:50 wt %) of 1,6-hexandiol diacrylate (HDDA) and 1,4-butanediol diglycidyl ether (BDDGE) was slowly added into the methanol-based MPS-modified $ZrO_2$ sol with stirring.

Then, the methanol-based mixture was concentrated by a rotary evaporator at a temperature lower than 30° C. to remove essentially all of the methanol solvent. The solvent solubilizes the epoxy monomers and acrylic monomers and suspends the silane-modified $ZrO_2$ particles. One of ordinary skill would recognize that other suitable solvents may be used as well. In yet another embodiment, the solvent may be left in any of the compositions disclosed herein, so that such compositions may further comprise at least one solvent. A colloidal composition consisting essentially of a continuous liquid phase of epoxy and acrylic monomers with a dispersed nanoparticulate of MPS-modified $ZrO_2$ was obtained. The MPS-modified $ZrO_2$ in the concentrated composition was about 30 wt %.

15 grams of this colloidal composition was mixed with DAR1173™ photo-polymerization initiator (3 wt %) and UVI6976™ photo-polymerization inhibitor (3 wt %) and EFKA3034™ surfactant (0.2 wt %) to obtain a UV-curable composition. Although DAR1173™, UVI6976™, and EFKA3034™ were used in this example, any other suitable free radical photo initiators, cationic photo initiators, or surfactants, respectively, may be used.

The UV-curable composition was then coated onto a PC plano lens and an ADC plano lens by a spin technique at 500 rpm for 10 seconds and then 1,000 rpm for 10 seconds. The coated lenses were cured by UV fusion lamp. The lens with these cured coatings showed very good optical properties, as reported in Table 1.

Comparative Example 1

MPS-Modified $ZrO_2$ in Acrylic Monomer 1,6-Hexandiol diacrylate (HDDA) was added slowly into the methanol-based MPS-modified $ZrO_2$ sol with stirring. Then the mixture was concentrated by a rotary evaporator at the temperature lower than 30° C. to remove the methanol. After concentration, a colloidal composition consisting essentially of a continuous liquid phase of acrylic monomer with a dispersed nanoparticulate of MPS-modified $ZrO_2$ was obtained. The MPS-modified $ZrO_2$ in the concentrated composition was about 30 wt %. This composition is referred to as "HDDA/MPSZrO$_2$".

15 g of this colloidal composition was mixed with DAR1173™ photo-polymerization initiator (6 wt %) and EFKA3034™ surfactant (0.2 wt %) to obtain a UV-curable composition. The UV-curable composition was then coated onto a PC plano lens and an ADC plano lens by a spin technique at 500 rpm for 10 seconds and 1,000 rpm for 10 seconds. The coated lenses were cured by UV fusion lamp. The obtained ACD lens showed very good optical properties, but the obtained PC lens showed a high haze value, a reported in Table 1.

Comparative Example 2

GPS-Modified $ZrO_2$ in Epoxy Monomer 1,4-Butanediol diglycidyl ether (BDDGE) was added slowly into the methanol based GPS-modified $ZrO_2$ sol with stirring. Then, the mixture was concentrated by a rotary evaporator at a temperature lower than 30° C. to remove the methanol. After concentration, a colloidal composition consisting essentially of a continuous liquid phase of epoxy monomer with a dispersed nanoparticulate of GPS-modified $ZrO_2$ was obtained. The GPS-modified $ZrO_2$ in the concentrated composition was about 30 wt %. This composition is referred to as "BDDGE/GPSZrO$_2$".

15 grams of this colloidal composition was mixed with UVI-6976 photo-polymerization initiator (6 wt %) and EFKA3034™ surfactant (0.2 wt %) to obtain a UV-curable composition. The UV-curable composition was then coated onto a PC plano lens and an ADC plano lens by a spin technique at 500 rpm for 10 seconds and then 1,000 rpm for 10 seconds. The coated lenses were cured by UV fusion lamp. The obtained ACD lens showed very good optical properties, but the obtained PC lens showed a high haze value, as reported in Table 1.

Comparative Example 3

Mixture of HDDA/MPSZrO$_2$ and BDDGE/GPSZrO$_2$ 7.5 grams of the HDDA/MPSZrO$_2$ from Comparative Example 2 and 7.5 g of the BDDGE/GPSZrO$_2$ from Comparative Example 3 were mixed with DAR1173™ photo-polymerization initiator (3 wt %) and UVI6976™ photo-polymerization initiator (3 wt %) and EFKA3034™ surfactant (0.2 wt %). The mixture gelled very quickly and was not a usable composition for use in coating of optical articles such as lenses, as reported in Table 1.

Comparative Example 4

GPS-Modified ZrO$_2$ in Acrylic-Epoxy Monomers

Example 1 was repeated except the silane was GPS (3-glycidoxypropyltrimethoxysilane) instead of MPS (3-methacryloxypropyl trimethoxysilane).

A mixture (50:50 wt %) of 1,6-hexandiol diacrylate (HDDA) and 1,4-butanediol diglycidyl ether (BDDGE) was slowly added into the methanol-based GPS-modified ZrO$_2$ sol with stirring.

Then, the methanol-based mixture was concentrated by a rotary evaporator at a temperature lower than 30° C. to remove essentially all of the methanol solvent. In other embodiments, other suitable solvents may be used, such as, but not limited to, ethanol, isopropanol, and water. A gel-like composition was obtained, which was not suitable for use in coating of optical articles such as lenses, as reported in Table 1.

TABLE 1

Examples of modified ZrO$_2$ compatibility with monomers

| Examples | ZrO$_2$ (wt %) | UV curable monomers | Silane surface agent | Solution for spin possibility | Haze on ADC lens | Haze on PC lens |
|---|---|---|---|---|---|---|
| Ex. 1 | 30 (in-situ) | Hybrid HDDA-BDDGE | MPS | Yes | 0.3 | 0.7 |
| Comp. Ex. 1 | 30 | HDDA | MPS | Yes | 0.3 | >10.0 |
| Comp. Ex. 2 | 30 | BDDGE | GPS | Yes | 0.3 | 6.0 |
| Comp. Ex. 3 | 30 | HDDA-BDDGE | MPS-GPS | NO | N/A | N/A |
| Comp. Ex. 4 | 30 (in-situ) | Hybrid HDDA-BDDGE | GPS | NO | N/A | N/A |

CONCLUSION

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

The invention claimed is:

1. A method comprising the steps of:
mixing an acrylic silane and a methanol-based ZrO$_2$ sol to create a methanol-based silane-modified ZrO$_2$ sol; then
mixing at least an acrylic monomer, an epoxy monomer, and the methanol-based silane-modified ZrO$_2$ sol to obtain a composition comprising:
a continuous liquid phase comprising an acrylic monomer and an epoxy monomer; and
a dispersed nanoparticulate comprising ZrO$_2$ modified with an acrylic silane; and
wherein the composition is transparent to visible light.

2. The method of claim 1, further comprising the step of: forming the methanol-based ZrO$_2$ sol.

3. The method of claim 2, wherein the step of forming the methanol-based ZrO$_2$ sol comprises the step of: dialyzing a water-based ZrO$_2$ sol in a methanol bath.

4. The method of claim 1, wherein the molar ratio of the acrylic silane to ZrO$_2$ is in the range of 0.1:1 to 0.2:1.

5. The method of claim 1, wherein the ratio of the acrylic monomer to the epoxy monomer is in the wt % range of approximately 10:90 to 90:10.

6. The method of claim 1, wherein the dispersed nanoparticulate is in the range of 10 to 70 wt % of the composition.

7. The method of claim 1, further comprising the step of: removing essentially all the methanol from the composition.

8. The method of claim 1, wherein the composition further comprises at least one photo-polymerization initiator for polymerizing the acrylic and epoxy monomers.

9. The method of claim 1, wherein the composition further comprises a surfactant.

10. The method of claim 1, further comprising the step of coating the composition onto an ophthalmic substrate.

11. A composition comprising:
a continuous liquid phase comprising an acrylic monomer and an epoxy monomer; and
a dispersed nanoparticulate comprising $ZrO_2$ modified with an acrylic silane; and
wherein the composition is transparent to visible light.

12. The composition of claim 11, wherein the acrylic silane is 3-methacryloxypropyltrimethoxysilane ("MPS").

13. The composition of claim 11, wherein the molar ratio of the acrylic silane to $ZrO_2$ is in the range of 0.1:1 to 0.2:1.

14. The composition of claim 11, wherein the ratio of the acrylic monomer to the epoxy monomer is in the wt % range of approximately 10:90 to 90:10.

15. The composition of claim 11, wherein the acrylic monomer is a difunctional (meth)acrylic monomer(s) or a multifunctional (meth)acrylic monomer(s).

16. The composition of claim 11, wherein the acrylic monomer is 1,6-hexandiol diacrylate (HDDA).

17. The composition of claim 11, wherein the epoxy monomer is a difunctional epoxy monomer(s) or a multifunctional epoxy monomer(s).

18. The composition of claim 11, wherein the epoxy monomer is 1,4-butanediol diglycidyl ether (BDDGE).

19. The composition of claim 11, wherein the dispersed nanoparticulate is in the range of 10 to 70 wt % of the wet composition.

20. An optical article comprising:
an ophthalmic lens substrate; and
a transparent, cured coating on the ophthalmic lens substrate, wherein the coating comprises:
a continuous solid phase comprising an acrylic-epoxy copolymer; and
a dispersed nanoparticulate of $ZrO_2$ modified with an acrylic silane.

* * * * *